July 3, 1928.
A. L. RIKER
1,675,909
WINDSHIELD
Original Filed Feb. 3, 1923  4 Sheets-Sheet 1
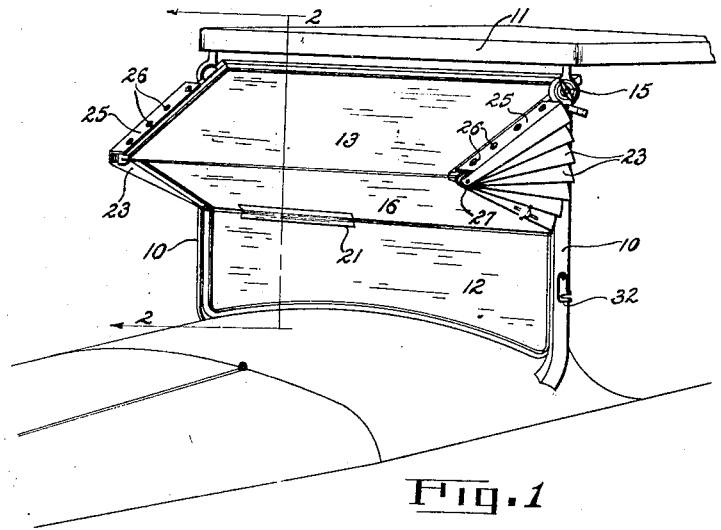
Fig.1
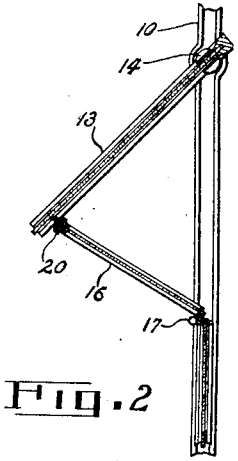
Fig.2
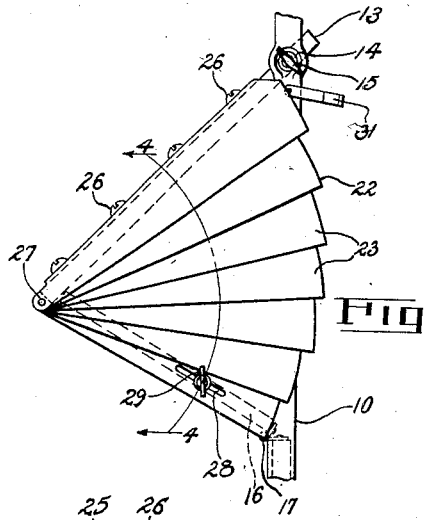
Fig.3
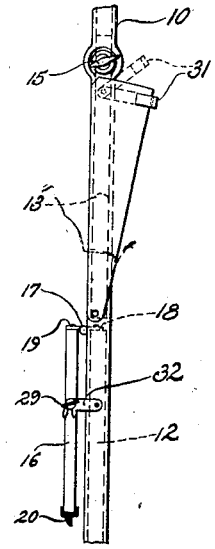
Fig.5
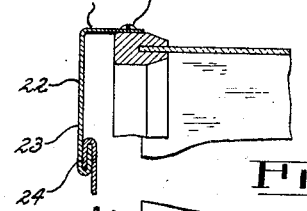
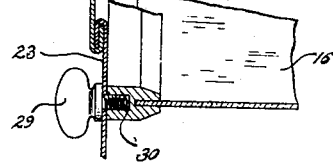
Fig.4
INVENTOR.
Andrew L. Riker.
BY
G. H. Braddock
ATTORNEY.

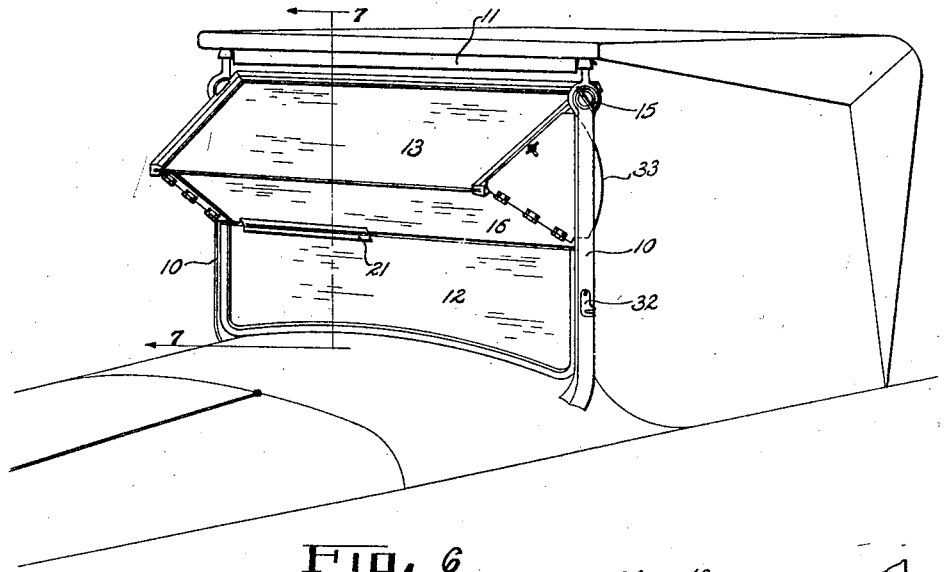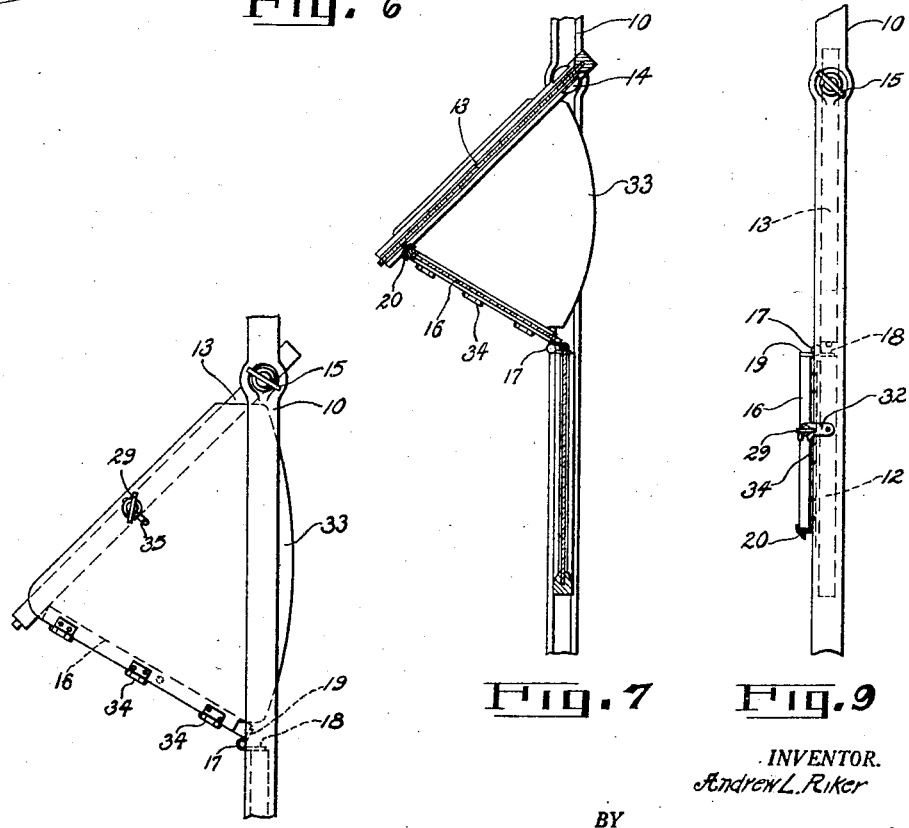

July 3, 1928.

A. L. RIKER 1,675,909

WINDSHIELD

Original Filed Feb. 3, 1923    4 Sheets-Sheet 3

INVENTOR.
Andrew L. Riker

BY
G. H. Braddock
ATTORNEY.

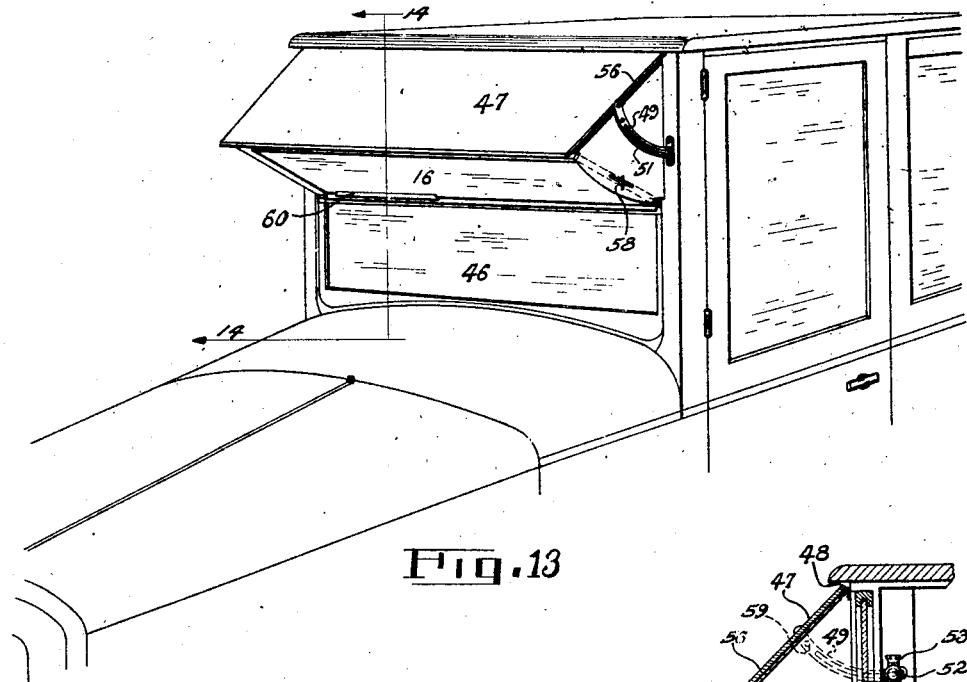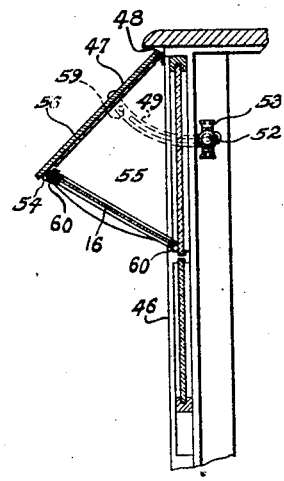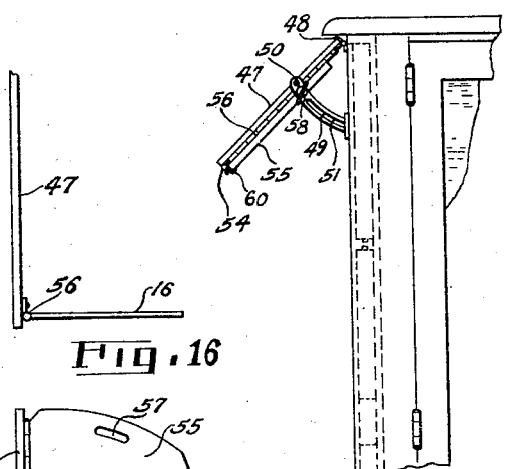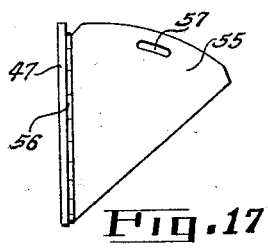

Patented July 3, 1928.

1,675,909

UNITED STATES PATENT OFFICE.

ANDREW L. RIKER, OF FAIRFIELD, CONNECTICUT.

WINDSHIELD.

Application filed February 3, 1923, Serial No. 616,716. Renewed May 7, 1928.

This invention relates to a windshield for automotive vehicles and the like, and has more particular reference to a storm vision wind shield.

An object of the invention is to provide a novel and improved wind shield having a member pervious to sight so situated as to be protected from the elements, such as snow, sleet, rain, dirt and dust, but located to afford clear vision ahead to the operator of a vehicle in connection with which the wind shield is utilized.

A further object is to provide a wind shield having a transparent vision member adapted to be situated at the front of a vehicle to assist in protecting occupants of the vehicle from the elements without being itself directly subjected to said elements.

Another object is to provide a novel vision member for a wind shield and to associate said vision member with the wind shield in novel and improved manner.

And another object is to equip the wind shield with unique side protecting devices for the novel vision member which may cooperate with said member in assisting in the protection of occupants of a vehicle against the elements.

Other objects and advantages will appear as the description proceeds.

An ordinary automobile wind shield may consist of a large frame including spaced apart uprights or stanchions and a cross member connecting the upper ends of the stanchions, and an upper and a lower wind shield glass, usually framed, mounted in the large frame to fill the same. Customarily, the upper glass or frame is pivotally associated with the stanchions to swing forwardly and upwardly at the front of the large frame, to provide an opening through the wind shield when desired.

Heretofore, when driving in a storm or when for any reason the upper wind shield glass has become coated with substances making vision ahead difficult or impossible, it has been the practice either to utilize some form of wind shield cleaner to keep the glass clear of substances, or to swing the upper windshield glass forwardly and upwardly to obtain clear vision ahead through the vision space provided. But, naturally, when this latter course is followed, snow, sleet, rain, dirt, dust, or other substance enters the automobile through the provided opening, in greater or smaller amounts depending upon the driving conditions prevailing, to the detriment of the operator and occupants of the automobile. The opening afforded is, nevertheless, suitable for proper vision ahead.

The present invention purposes to provide a vision member to cover the opening or vision space afforded through an ordinary wind shield in the manner just explained and to so locate the vision member in said opening that (1) it will not in any way hinder direct vision ahead; and (2) it will be protected from the elements to the extent that no substances or particles whatever can become coated or caked upon the vision member to impair its perviousness to sight.

A principle of the invention is that the vision member is located at suitable angle to allow an operator of a vehicle direct vision ahead and also at suitable angle to preclude the depositing of substances or particles, commonly encountered by ordinary wind shields in use, upon the vision member, and I desire it understood that the improved wind shield or novel vision member may find use in manners other than the one set forth in the preceding paragraph, within the spirit of the invention and the scope of the appended claims, in connection with automotive vehicles as well as in connection with other structures. For example, the novel vision member could be employed in addition to the upper and lower glasses of a wind shield, as with an ordinary or preferred form of sun shade or visor, so-called, or could be employed as a separate article of manufacture to be associated with an ordinary wind shield, all to be hereinafter fully described.

Incidentally, in the case of any form of the invention, side protecting devices are to be preferred for the vision member itself, as well as (in some instances) for the benefit of occupants of a vehicle, and the invention purposes to provide side protecting devices suitable to their purpose.

In the accompanying drawing forming a part of this specification I have preferred to illustrate four different embodiments of the invention, each embodiment comprising a single sheet of the four sheets of drawings.

Fig. 1 is a perspective view of an ordinary wind shield equipped with a novel vision member incorporating the features of the invention, showing side protecting devices carried by the frame of the upper wind shield glass of the wind shield;

Fig. 2 is a sectional view on line 2—2 in Fig. 1, looking in the direction of the arrows, the side protecting devices being omitted;

Fig. 3 is an end view of the wind shield looking toward the right side of Fig. 1;

Fig. 4 is an enlarged sectional view on line 4—4 in Fig. 3, looking in the direction of the arrows;

Fig. 5 is an end view showing the upper wind shield glass in closed position and the novel vision member and side protecting devices as when not in use;

Fig. 6 is a perspective view of an ordinary wind shield equipped with a modified form of vision member, showing side protecting devices carried by the vision member;

Fig. 7 is a sectional view on line 7—7 in Fig. 6, looking in the direction of the arrows;

Fig. 8 is an end view of the wind shield of Fig. 6, looking toward the right side of Fig. 6;

Fig. 9 is an end view showing the upper wind shield glass in closed position and the novel vision member and side protecting devices of Fig. 6 as when not in use;

Fig. 13 is a perspective view of an ordinary wind shield and another modified form of novel vision member associated with an ordinary or preferred sun shade or visor;

Fig. 14 is a sectional view on line 14—14 in Fig. 13, looking in the direction of the arrows;

Fig. 15 is an end view showing the vision member and side protecting devices of Fig. 13 as when not in use; and Figs. 16 and 17 are details of the sun shade or visor and a side protecting device of Fig. 13.

Figure 10:
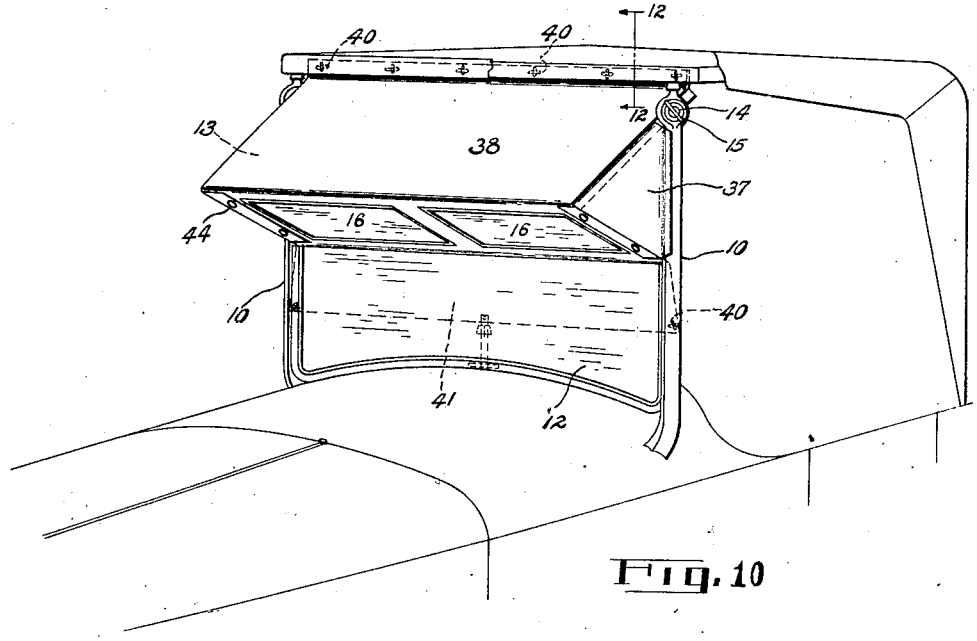
Fig. 10 is a perspective view of an ordinary wind shield equipped with an article of manufacture in which the features of the invention are incorporated.

Referring to the embodiment of the invention disclosed in Figs. 1 to 5, 10 denotes uprights or stanchions of an ordinary wind shield, 11 a cross member between the upper ends of the stanchions, 12 the lower wind shield with frame and 13 the upper wind shield glass with frame.

The glasses 12, 13, with frames, are adapted to fill the large frame which includes the stanchions and cross member, and the upper wind shield glass frame may be pivoted as at 14 in the stanchions 10 to be swung to closed position as in Fig. 5, or to open position (in front of the stanchions) as in Figs. 1 to 3, numeral 15 denoting ordinary clamps for fastening the upper wind shield frame in closed position or in any adjusted open position. In Figs. 1 to 3 the upper wind shield glass frame is shown in an adjusted position adapted to allow sufficient opening between the upper and lower wind shield glasses suitable for proper vision ahead. As disclosed, the upper wind shield glass has been swung on its axis to describe an arc measuring approximately 45 degrees, although the arc described could be somewhat larger or smaller, if this is preferred.

Numeral 16 denotes the vision member of the invention, which may be of any material pervious to sight. As shown, the vision member is framed glass. 17 denotes a hinge secured to the upper edge of the lower wind shield glass frame as at 18 and to the upper or rearward edge of the vision member frame as at 19, to support the vision member so that it can be swung, from its position in Fig. 5 to its position in Figs. 1 to 3 to fill the opening between the upper and lower wind shield glasses. 20 denotes a rubber strip which may be utilized to effect a tight closure between the upper wind shield glass and the vision member, and 21 denotes an equivalent rubber strip between the lower wind shield glass and vision member.

Numeral 22 denotes side protecting devices for filling the spaces at the sides or ends of the wind shield and vision member in front of the stanchions when the upper wind shield glass frame is in open position and the vision member is situated as in Figs. 1 to 3. As disclosed, each side protecting device consists of telescoping plates 23 including hook portions 24 adapted to interengage when the plates are distended as in Figs. 1, 3 and 4, the upper telescoping plate having a flange 25, secured to the opposite ends or sides of the upper wind shield as at 26, to clear the stanchion when the upper wind shield frame is closed, and a pin 27 in the forward or lower end of the upper telescoping plate pivotally carries all of the other telescoping plates.

The telescoping plates are of sufficient length to effectively cover the side or end openings, and the lower plate of each side protecting device may have an elongated slot 28 to receive a thumb screw 29 adapted to enter a threaded opening 30 in each of the side edges of the vision member. See Fig. 4. A hook 31 pivoted upon the upper portion of each stanchion 10 may be utilized to retain the telescoping plates in folded position when not in use, and a hook 32 pivoted upon the lower portion of each stanchion to engage a thumb screw 29 may insure the folded down or out of use position of the vision member. See Fig. 5.

The manner in which the vision member and side protecting devices may be set up for use will be clear. When the parts are situated as in Fig. 5 and it is desired to utilize the vision member, the upper wind shield glass frame may be swung upwardly and forwardly to provide the necessary opening for proper vision ahead and the clamps 15 may be utilized to fasten the upper wind shield glass in adjusted position; the vision member may be released from the hook 32 and swung upwardly so that its free edge is contiguous with the rearward face of the upper wind shield at or adjacent to the lower or forward end of said glass; the telescoping plates may be released from the hook 31 and distended to cover the end or side openings; and the thumb screws 29 may be removed from the threaded openings 30 in the vision member to be reinserted therein through the elongated slots 28. When the thumb screws have been fastened down at the proper position in the elongated slots for the adjustment of the upper wind shield glass the lower telescoping plates and vision member have been fixed with respect to each other, as will be apparent from Figs. 1, 3 and 4. The vision member and protecting devices may be returned to their out of use positions by reversing the operations described.

Referring to the form of the invention of Figs. 6 to 9, 10 denotes uprights or stanchions as before, 11 a cross member between the stanchions, 12 the lower wind shield glass with frame and 13 the upper wind shield glass with frame, and the glasses 12, 13, with frames, fill the large frame which includes the stanchions and cross member as before, the upper windshield frame being pivoted as at 14 in the stanchions 10 to be swung to closed position as in Fig. 9, or to open position (in front of the stanchions) as in Figs. 6 to 8, numeral 15 denoting clamps for fastening the upper wind shield frame in closed or open position. The upper wind shield glass frame is shown in Figs. 6 to 8 in about the same adjustment position as in Figs. 1 to 3, for the same purpose.

Numeral 16 denotes the vision member of the invention, the equivalent of the vision member of Figs. 1 to 5 and similarly mounted by means of hinges 17 secured to the lower wind shield glass frame as at 18 and to the vision member frame as at 19. 20 and 21 denote rubber strips as hereinbefore described.

Numeral 33 denotes side protecting devices for filling the spaces at the ends or sides of the wind shield and vision member in front of the stanchions when the upper wind shield glass frame is in open position and the vision member is situated as in Figs. 6 to 8.

As disclosed, in the present instance each side protecting device consists of a single, properly shaped plate hinged upon a side or end edge of the vision member as at 34 to be swung to the position as disclosed in Figs. 6 to 8, with its rearward edge between a side edge of the upper wind shield glass frame and a stanchion, or to the position as disclosed in Fig. 9, against the rearward face of the vision member, between said member and the lower wind shield glass. A hook 32 pivoted upon the lower portion of each stanchion may engage a removable thumb screw 29 in each side or end edge of the vision member to insure the out of use position of the vision member (see Fig. 9).

The plates 33 may each have an elongated slot 35, and thumb screws 29, extending through each slot and entering threaded openings in the upper wind shield frame may insure the fixed relation of the plates 33 and upper wind shield glass when adjusted to any position permitted by the elongated slots, to thus locate the vision member.

The vision member and side protecting devices of the present embodiment of the invention may be set up as follows: When the parts are as disclosed in Fig. 9, the upper wind shield glass may be swung forwardly and upwardly on its pivot and fastened in ordinary manner; the vision member may be released from the hooks 32 to be swung forwardly and upwardly; the plates 33 may be swung about the side edges of the vision member and the rearward ends of the plates may be made to lie between the upper wind shield glass frame and stanchions 10, the upper edges of the plates extending to or beyond the upper wind shield glass frame; the thumb screws 29 may be inserted through the slots 35 and into the threaded openings in the upper wind shield glass frame; the vision member may be positioned so that its rubber strip 20 is in engagement with the upper wind shield glass; and the screws 29 may then be fastened down to fix the parts of the wind shield relatively to each other. The vision member and side protecting devices may be returned to their out of use positions by reversing the operations described.

Figure 11:
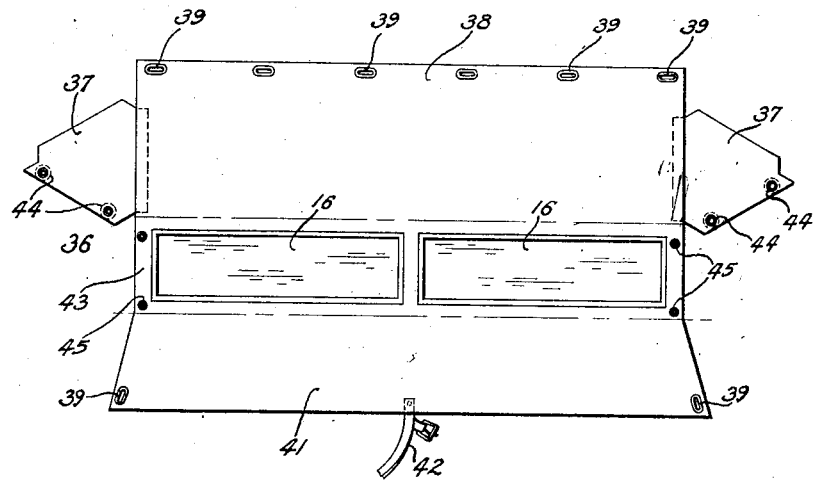
Fig. 11 is a plan view of the article of manufacture of Fig. 10 removed from the wind shield.
Figure 12:
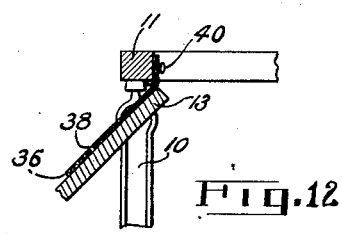
Fig. 12 is an enlarged sectional view on line 12—12 in Fig. 10, looking in the direction of the arrows.

Referring to the form of the invention of Figs. 10 to 12, 10 denotes stanchions, 11 a cross member extending between the stanchions, 12 the lower wind shield glass with frame and 13 the upper wind shield glass with frame, the glasses 12, 13, with frames, filling the large frame which includes the stanchions and cross member. 14 denotes pivots for the upper wind shield glass frame in the stanchions 10, and 15 denotes clamps for the upper frame, as in the case of Figs. 1 to 9. The upper wind shield glass is shown in Fig. 10 in about the same adjusted position as in Figs. 1 to 9, for the same purpose.

Numeral 36 represents an article of manufacture which may be associated with the wind shield of Fig. 10 to provide said wind shield with a vision member, more particularly identified by numeral 16, adapted to be located in the opening or vision space which would otherwise exist between the upper and lower wind shield glasses of Fig. 10.

As disclosed, the article of manufacture consists of any suitable material, such as leather or canvas, to fit over the front surface of the upper wind shield glass and over the rear surface of the lower wind shield glass, the material including the transparent element, or elements, 16 to be located in the vision space between the glasses, and also including side or end flaps 37 to cover the space at the sides or ends of the wind shield frame and vision member in front of the stanchions. That is to say, the article of manufacture 36 includes a portion 38 of material, carrying side flaps 37 and preferably of slightly greater area than the upper wind shield glass, having holes 39 to receive studs 40 upon the cross member 11, and also includes a portion of material 41 with holes 39 to receive studs 40 upon the lower portions of the stanchions 10 and a buckle with strap 42 to be secured in any manner to the lower portion of the large wind shield frame, as well as the portion of material 43 having the vision elements 16.

The side flaps 37 may have studs 44 to enter sockets 45 in the opposite ends of the portion of material 43.

The manner in which the article of manufacture may be applied to use is clearly shown in Figs. 10 and 12. The portion 38 of material is laid upon the upper wind shield glass 13 and is made to extend between said upper glass and cross member so that its upper edge can be secured to the cross member by means of studs 40 entering holes 39; the portion 41 of material is made to extend over the rear surface of the lower wind shield glass 12 so that its lower edge can be fastened to studs 40 in stanchions 10 by means of holes 39 and to the lower portion of the large frame by means of buckle with strap 42; the portion 43 of material is stretched between and over the adjacent edges of the upper and lower wind shield glasses in such manner as to locate the vision element, or elements, 16 in the vision space for proper vision ahead; and the side flaps 37 are secured to the portion 43 of material by means of studs 44 entering sockets 45 to effectively cover the side or end openings defined by the stanchions, the upper windshield glass and the vision member.

Preferably, when the article of manufacture is applied to an ordinary wind shield, the rearward portions of the side flaps 37 extend beyond the forward edges of the stanchions, as disclosed. All of the material of the article could be transparent, should this be desirable, or the vision element could extend over the whole of the vision space between the glasses and part way over the lower wind shield glass. Obviously, the article could have construction somewhat different from that described to be fitted in the vision space in a manner different from that disclosed.

Referring to the form of the invention of Figs. 13 to 17, 46 represents a closed wind shield (without vision space), and 47 represents a sun shade or visor having its upper edge hinged to the upper portion of the wind shield as indicated at 48.

The sun shade or visor may be adjusted to any angle with respect to the wind shield and may be retained in its adjusted position by means of arms 49, one at each side of the sun shade or visor, passing rearwardly through the frame of the wind shield and pivoted upon the sun shade or visor as at 50, each arm having a curved slot 51 receiving a clamp 52 arranged in a bracket 53 to the rear of the wind shield frame and insuring the position of the arm 49.

Numeral 16 denotes the vision member of material pervious to sight, hinged at or adjacent to the lower or forward edge of the sun shade or visor, as at 54, and 55 denotes side protecting devices or flaps hinged at or adjacent to the side edges of the sun shade or visor, as at 56. 57 denotes an elongated slot in each side protecting device 55 to receive a thumb screw 58 adapted to enter each side edge of the vision member. 59 represents a threaded opening in each arm 49 adjacent its pivot 50 to receive a thumb screw when the vision member is not in use, and 60 represents rubber strips which may be situated between the vision member and the wind shield and sun shade or visor, respectively.

When the vision member and side protecting devices are not in use they are folded up against the under face of the sun shade or visor (see Fig. 15), the vision member lying against the sun shade or visor and the protecting devices or side flaps lying against the vision member. The thumb screws 58 in threaded openings 59 insure the out of use location of the vision member and side flaps, as will be understood. See Fig. 15.

To use the vision member, the arms 49 may be released from their clamps and the sun shade or visor may be swung upwardly; the thumb screws 58 may be removed from the threaded openings 59 to allow the side flaps and vision member to swing downwardly; the thumb screws 58 may be inserted through the elongated slots 57 and into the openings in the edges of the vision member; and the clamps 52 and thumb screws 58 may be fastened down, after proper adjustment of the sun shade or visor, the vision member and the side protecting devices relatively to each other and relatively to the wind shield frame, to insure the desired fixed relation of the parts mentioned. Preferably, the rear edges of the side protecting devices now rest snugly against the wind shield frame, while the lower edges thereof extend beyond the vision member. See Figs. 13 and 14. By reversing the operations described, the vision member and side flaps can be returned to their positions of Fig. 15.

It should be noted that the sun shade or visor of Figs. 13 and 14 is arranged at an angle of about 45 degrees to the wind shield, as is the upper wind shield of each of the other embodiments of the invention. The vision member disclosed is framed glass.

The first three forms of the invention as herein illustrated suggest open type automobiles, while the fourth form suggests an automobile of closed type. It will be clear that any form of the invention could be applied to any type automobile, or the principles of the invention could be applied to structures other than automotive vehicles.

In the instance of any form of the invention, the vision member will be situated to afford clear vision ahead to an operator of a vehicle, but will be located to be protected from the elements to the extent that no substances whatever, ordinarily encountered by common wind shields, can become attached to the vision member to impair its perviousness to sight. The side protecting devices or flaps in the case of the first three embodiments of the invention herein protect the vision member as well as occupants of a vehicle from flying particles or substances, while the side protecting devices or flaps of the fourth embodiment of the invention are necessary to protect the vision member only.

Obviously, in each embodiment of the invention disclosed, the vision member is set at angular relation with respect to the vertical making it impossible for particles or substances to adhere to said member. By actual experience, when driving in a heavy snow and sleet storm so that the upper wind shield glass and the major portion of the lower wind shield glass become quickly coated with snow and sleet, no particle of the snow or sleet becomes attached to the vision member. Actually, the vision member cooperates with the upper, forwardly disposed wind shield glass and the lower wind shield glass to cause a pocket of air to be always trapped directly in front of the vision member and adjacent the upper and lower wind shield glasses, (to the rear of the upper glass and in front of the lower glass), so that when driving in a storm there is a resultant, churning force applied directly in front of the vision member producing eddy currents stopping practically all (if not all) of the substances or elements advancing toward the vision member from even striking it. In fact, this churning action is so pronounced that not only the vision member is kept clean, but a width of greater or less magnitude of the lower wind shield glass just beneath the vision member is also kept free of substances or particles.

As disclosed, each vision member is disposed at an angle of 30 degrees upwardly from the horizontal, but each could be at somewhat different angle within the spirit of the invention, so long as the advancing or forward face of the vision member is obliquely disposed to the wind shield to allow direct vision ahead past the vision space without being directly subjected to the elements encountered. Naturally to allow proper vision ahead, the forward portion of the vision member must be at higher elevation than the rearward portion thereof.

While I have shown all of the side protecting devices as of opaque material, obviously these can be transparent or translucent.

Having thus fully described the invention, what I claim as new and desire to secure by Letters Patent is:

1. In combination with a vehicle, a shield member associated with the forward portion of the vehicle and extending forwardly of the vehicle and downwardly at an acute angle with respect to the vertical, a vision member associated with the vehicle and shield member and extending forwardly of the vehicle and upwardly at an acute angle with respect to the horizontal, the vision member being adapted to completely fill the space between the vehicle and shield member in any of several positions of adjustment, and side protecting devices associated with the shield member, vision member and vehicle, said side protecting devices being adapted to allow relative adjustment of the vision member and shield member.

2. In combination with a vehicle, a shield member secured at the front of the vehicle and extending forwardly and downwardly at an acute angle with respect to the vertical, a vision member having its forward portion in engagement with the lower portion of the shield member and its rearward portion in engagement with the vehicle, the vision member extending forwardly from the vehicle and upwardly at an acute angle with respect to the horizontal, whereby side openings are defined by the shield member, vision member and vehicle, and side flaps covering said openings, said side flaps being adapted to allow angular adjustment of said vision member relatively to the shield member and vehicle and also allow the forward portion of the vision member to engage the shield member and the rearward portion of the vision member to engage the vehicle in several different positions of its adjustment.

3. The combination as specified in claim 2, and means for storing the side flaps.

4. A wind shield, comprising a lower glass, an upper glass adapted to align with said lower glass or to be disposed forwardly to provide a vision space between the glasses, spaced apart stanchions in which the glasses are mounted, a vision member pivotally associated with the lower wind shield glass and adapted to be situated in said vision space, the vision member, upper glass and stanchions defining openings at the sides of the wind shield, side protecting devices adapted to cover said openings, the side protecting devices being constituted by telescoping plates carried by the upper wind shield glass, means for securing the vision member and side protecting devices in their positions of use in connection with the upper and lower wind shield glasses, and means for fastening the vision member to the lower wind shield glass and for holding the telescoping plates folded when the vision member and side protecting devices are out of use.

5. A wind shield, comprising a lower glass, an upper glass adapted to align with said lower glass or to be disposed forwardly to provide a vision space between the glasses, spaced apart stanchions in which the glasses are mounted, a vision member pivotally associated with the lower wind shield glass and adapted to be situated in said vision space, the vision member, upper glass and stanchions defining openings at the sides of the wind shield, side protecting devices pivotally associated with the vision member and adapted to cover said openings, and means for storing the vision member and side protecting devices adjacent the lower wind shield glass when not in use.

Signed at Bridgeport, in the county of Fairfield, and State of Connecticut, this 2nd day of February, A. D., 1923.

ANDREW L. RIKER.